United States Patent
Gress

(10) Patent No.: US 6,719,244 B1
(45) Date of Patent: Apr. 13, 2004

(54) VTOL AIRCRAFT CONTROL USING OPPOSED TILTING OF ITS DUAL PROPELLERS OR FANS

(76) Inventor: Gary Robert Gress, 23 Laurelwood Cres., Toronto, Ontario (CA), M9P 1L4

( * ) Notice: Subject to any disclaimer, the term of this patent is extended or adjusted under 35 U.S.C. 154(b) by 0 days.

(21) Appl. No.: 10/355,995

(22) Filed: Feb. 3, 2003

(51) Int. Cl.$^7$ .............................................. B64C 27/22
(52) U.S. Cl. ....................... 244/7 R; 244/17.25; 244/56
(58) Field of Search .................... 244/6, 7 R, 17.23, 244/17.25, 17.11, 75 R, 56, 66; 416/123, 120, 122, 130

(56) References Cited

U.S. PATENT DOCUMENTS

| | | | | |
|---|---|---|---|---|
| 3,181,810 | A | * | 5/1965 | Olson .......................... 244/7 R |
| 3,273,827 | A | * | 9/1966 | Girard ......................... 244/201 |
| 3,321,022 | A | * | 5/1967 | Ogur ........................... 416/112 |
| 4,504,029 | A | * | 3/1985 | Erickmann .................... 244/54 |
| 6,467,724 | B2 | * | 10/2002 | Kuenkler ................. 244/17.25 |
| 2002/0104922 | A1 | * | 8/2002 | Nakamura ............... 244/17.25 |
| 2002/0153452 | A1 | * | 10/2002 | King et al. ................... 244/56 |
| 2003/0094537 | A1 | * | 5/2003 | Austen-Brown ............ 244/7 R |

* cited by examiner

Primary Examiner—Peter M. Poon
Assistant Examiner—Timothy D. Collins
(74) Attorney, Agent, or Firm—MacRae & Co.; H. W. Rock

(57) ABSTRACT

The invention relates to improvements with regards to the control of VTOL aircraft that use two propellers or fans as the primary lifting devices in hover. More particularly, the invention is a means for effecting control of the aircraft using just the two propellers alone, and comprises the in-flight tilting of them—which are of the conventional, non-articulated type (though they may have collective blade-pitch)—directly and equally towards or away from one another (and therefore about parallel axes) as necessary for the generation of propeller torque-induced and gyroscopic control moments on the aircraft about an axis perpendicular to the propeller tilt and mean-spin-axes. For a side-by-side propeller arrangement, therefore, their (lateral) tilting towards or away from one another produces aircraft pitch control moments for full control of the aircraft in that direction. Unlike the prior art, no cyclic blade-pitch control, slipstream-deflecting vanes, exhaust nozzles, tail rotors or extra propellers or fans, or conventional control surfaces are needed to effect this aircraft pitch control.

1 Claim, 5 Drawing Sheets

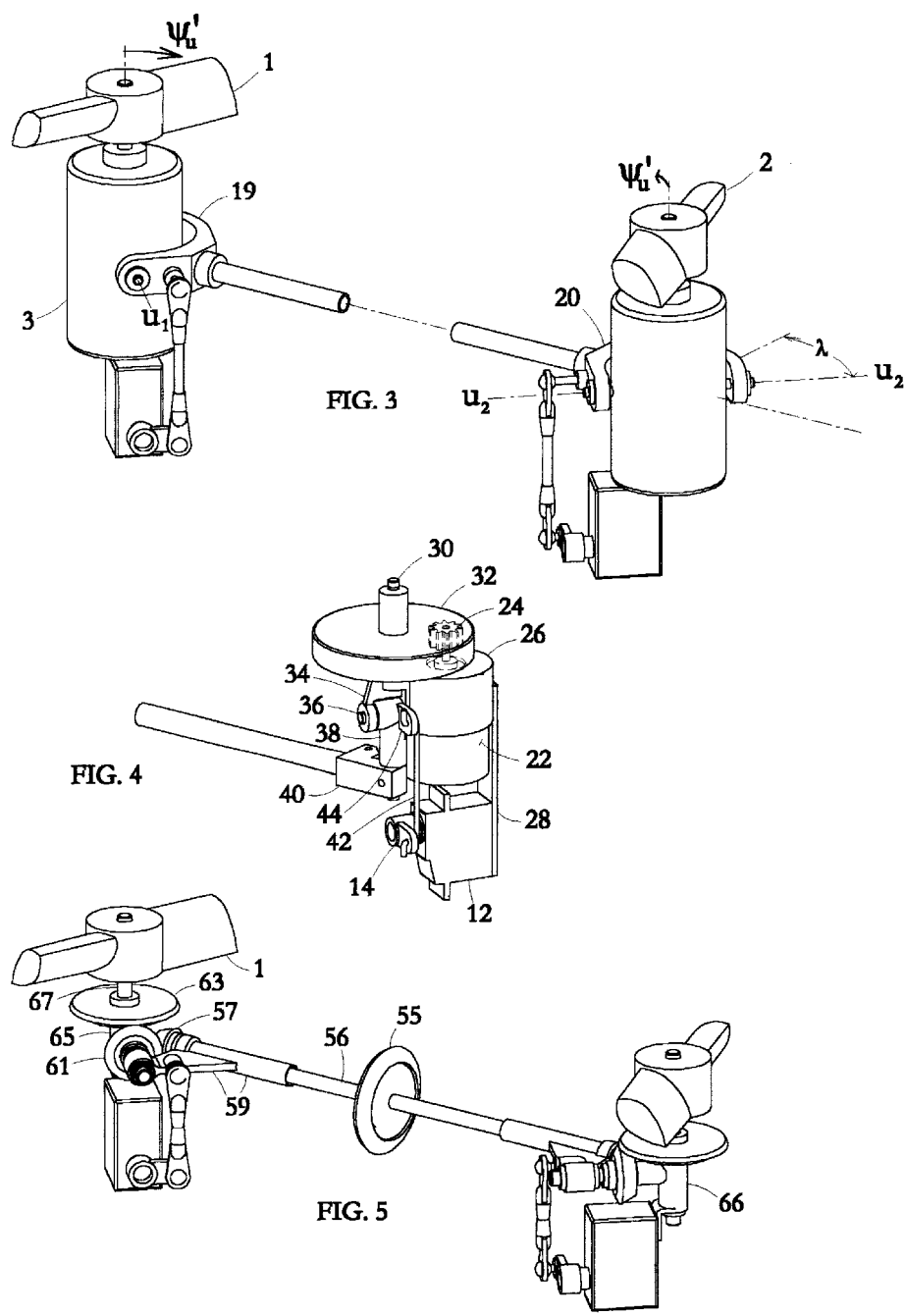

VTOL AIRCRAFT CONTROL USING OPPOSED TILTING OF ITS DUAL PROPELLERS OR FANS

BACKGROUND OF THE INVENTION

The requirement for hover stability and control of vertical takeoff and landing (VTOL) rotorcraft other than helicopters—which are limited in forward speed capability—has normally produced solutions which are far from ideal; most being either more complex than a helicopter or compromised in some fashion.

Ideally, just two propellers or fans would be all that was required for providing lift and control in hover. However, past VTOL aircraft have not been able to hover in a stable manner and under full control without additional reactive devices, these devices primarily enabling control about the axis joining the two fans.

For their stability and control in hover, all past and present VTOL rotorcraft have employed—in their construction or proposal—either: cyclic blade-pitch controls (helicopters and tilt-rotors); more than two propellers or fans; vanes in the propeller/fan slipstreams; or some other secondary, reactive device in addition to the main lifting propellers/fans.

Cyclic pitch control is not suitable for small, high speed fans, and so is not-conducive to VTOL aircraft with small footprints. Moreover, this solution results in a duplicity of intricate mechanics when applied to more than one rotor.

Aircraft using more than two fans have mechanically complex and heavy drive-trains, and their configurations are usually compromised or restricted by the additional devices. These deficiencies are compounded when the aircraft is intended to transition to airplane mode: either all the fans/propellers must be made to tilt, or some become excess weight and drag.

Hover stability and control using just vanes or control surfaces in the propeller/fan slipstreams have been marginalized by the difficulty in obtaining sufficient control moments, since their effectiveness depends on their vertical distance from the aircraft center of gravity and so restricts—or is restricted by—the aircraft configuration. For instance, there may be reduced vane effectiveness in ground proximity.

BRIEF SUMMARY OF THE INVENTION

By utilizing the gyroscopic properties of dual, counter-rotating propellers or fans, the present invention provides aircraft control without the need for cyclic controls or additional reactive devices.

Tilting the two propellers directly towards or away from each other creates gyroscopic and propeller-torque moments about the axis perpendicular to the tilt and mean spin axes, and so provides the required aircraft control about that axis. Specifically, the propeller axes are made to tilt within a common plane as necessary, in opposite directions by an equal amount and rate. The control method is therefore hence referred to as opposed tilting. The unbalanced gyroscopic moments are a result of the tilt rate, and the propeller-torque moments are due to the tilt angle from the aircraft vertical. These effects are independent of the vertical placement of the aircraft center of gravity.

For full aircraft control the propellers may also tilt in a direction perpendicular to the opposed tilting direction, providing both horizontal motion and yaw control. They also may be tilted collectively as well as oppositely in the opposed tilting direction. In general, the resulting combined tilting is referred to as oblique tilting.

BRIEF DESCRIPTION OF THE DRAWINGS

FIG. 3 is a perspective view of a representative fixed oblique tilting arrangement.

FIG. 4 is a perspective view of an implementation of fixed oblique tilting for model aircraft.

FIG. 5 is a perspective view of an implementation of fixed oblique tilting having a central engine driving the propellers.

DETAILED DESCRIPTION OF THE INVENTION

Figure 1:
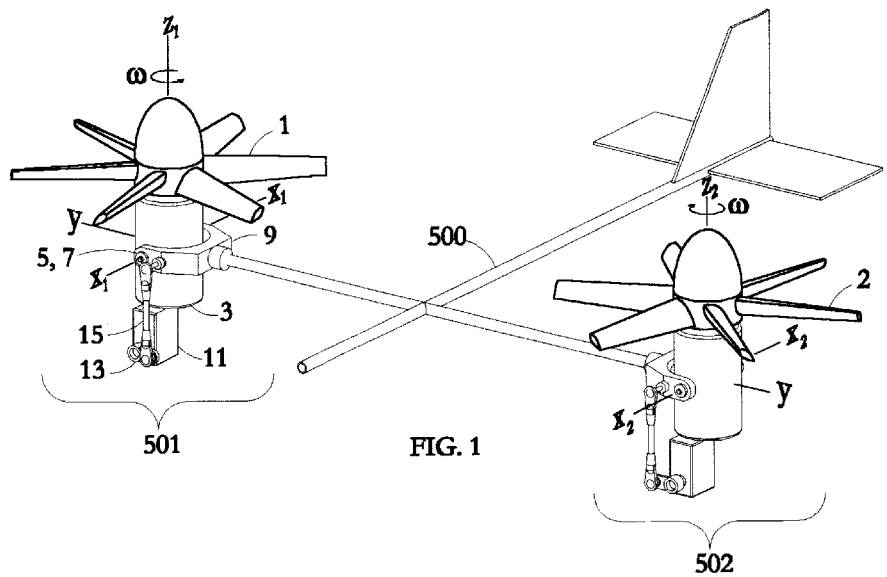
FIG. 1 is a perspective view of a side-by-side stick model aircraft representation employing the elements essential for opposed tilting control.

FIG. 1 shows a stick-frame representation of a hovering aircraft incorporating the essential, representative elements necessary to the invention. Though this is of a side-by-side fan configuration the discussion to follow applies equally as well to tandem and co-axial configurations. And, although the aircraft employs only lateral opposed tilting, the resulting control in pitch described herein reflects the pitch control obtained with the lateral opposed-portion of more general tilting.

Fixed to the airframe 500 are two lift-generating pods 501 and 502 which consist of lift fans or propellers 1 and 2 respectively, and the means to spin them and to tilt them laterally about parallel longitudinal axes $x_1$—$x_1$ and $x_2$—$x_2$ respectively. Pods 501 and 502 are constructed and act identically but opposite—being mirrored in a vertical plane containing the aircraft center longitudinal axis.

Considering then just pod 501, it consists of the lifting propeller or fan 1, which is-turned about its spin axis by motor/gearbox 3—which is representative of the drive system—in the direction shown at speed @. Via axles 5 and bushings/bearings 7 the motor/gearbox 3, and subsequently the fan 1, can pivot laterally about the local longitudinal axis $x_1$—$x_1$ within yoke 9, which is representative of the pivot device. Here the yoke 9 is rigidly fixed to the airframe 500, but it can be made to pivot relative to the airframe about lateral axis y—y by separate means for thrust vectoring, as will be shown in the subsequent embodiments.

Fixed to the motor/gearbox 3 is servo actuator 11, whose output arm 13 rotates in response to input signals coming from the pilot and/or stability augmentation system (SAS). Through linkage 15 the servo arm 13 is connected to the yoke 9, the attachment point being offset from axis $x_1$—$x_1$. Therefore, rotation of the servo arm 13 causes the motor gearbox 3 and fan 1 to tilt laterally about axis $x_1$—$x_1$ in proportion. Similar tilting can be obtained if the servo 11 is mounted to the airframe 500 instead, its output arm 13 connected to the motor/gearbox 3.

Figure 2:
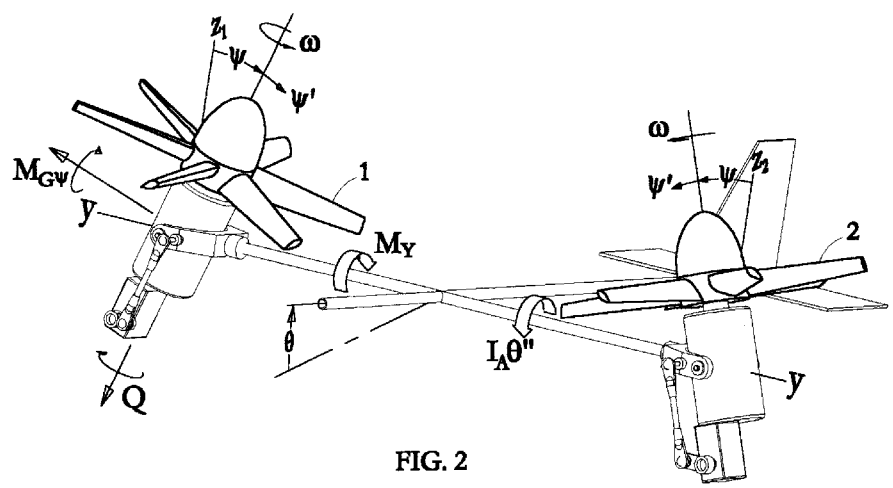
FIG. 2 is a perspective view of the stick model's fans tilting equally inwards, and the resulting pitching of the aircraft.

FIG. 2 shows the spin axes of the two fans 1 and 2 being simultaneously tilted laterally from the aircraft verticals $z_1$ and $z_2$ by equal but opposite angles $\Psi$ and at equal but opposite rates $\Psi'$. Considering again just fan 1, this tilting causes it to generate a gyroscopic moment $M_{G\Psi}$, whose vector is perpendicular to the fan's spin and tilt axes, and whose magnitude is equal to the product $I_R@\Psi'$, where $I_R$ is the mass moment of inertia of the fan about its spin axis (ignoring motor/gearbox 3). The horizontal component of vector $M_{G\Psi}$, resolved along lateral axis y—y, contributes to the pitching moment $M_Y$ acting on the aircraft. Also contributing to $M_Y$ is the horizontal component of the fan-torque vector Q. $M_Y$ is then the sum of these two effects from both fans:

$$M_Y = 2(M_{G_\psi}\cos\psi + Q\sin\psi)$$
$$= 2(I_R\omega\psi'\cos\psi + Q\sin\psi)$$

Pitching moment $M_Y$ as a result of fan lateral tilting causes the aircraft to accelerate in pitch about lateral axis y—y, assumed to pass through the aircraft center of gravity (which, for convenience but not necessary, is placed at the same vertical location as the fan tilt axes). If $\theta$ is the aircraft pitch angle, then equating $M_Y$ to the aircraft inertial moment $I_A\theta''$—where $I_A$ is the mass moment of inertia of the aircraft about y—y—gives the equation of pitching motion of the aircraft in hover:

½ $I_A\theta'' = I_R@\Psi'\cos\Psi + Q\sin\Psi$

With this relation it is easily shown that the aircraft is dynamically stable in pitch when-using a simple control model in the SAS such as $\Psi=-k\theta$ or $\Psi=-k\theta'$ ($\theta$ or $\theta'$ determined by appropriate sensors); also, that the aircraft will respond appropriately (converge to a new pitch angle) to intentional, momentary control inputs.

In the case at hand the axis y—y about which My acts is the aircraft pitch axis, but in general terms it is the axis perpendicular to the propellers' (parallel) tilt axes and to the mean of their spin axes.

Pitch control alone will not sustain forward motion of the aircraft in hover mode if the aircraft is to remain essentially horizontal. For this, some longitudinal thrust vectoring is required, and a simple way of obtaining it is to skew the fan or propeller tilt axes such that a portion of the tilting is in the longitudinal direction. FIG. 3 shows such an arrangement, where yokes 19 and 20 are oriented so that the respective tilt axes $u_1$—$u_1$ and $u_2$—$u_2$ are at equal but opposite angles $\lambda$ from the longitudinal axis. Tilting the propellers 1 and 2 simultaneously at equal rates $\Psi_u'$—and in the same longitudinal direction—about axes $u_1$—$u_1$ and $u_2$—$u_2$ respectively creates aircraft pitch control moments as before (due to the lateral component of the tilting) and now also a longitudinal thrust component. This method of control is referred to as fixed oblique tilting.

An implementation of fixed oblique tilting for electric model aircraft is the pod shown in FIG. 4, where the electric motor 22, driving a toothed pinion gear 24, is encased in a motor cap 26. Integral to motor cap 26 are the mounting plate 28 for the servo 12; a fixed or embedded output shaft 30—about which the internal-tooth reduction gear 32 and attached propeller (not shown) spin—and the yoke 34. The entire foregoing tilt collectively about the axis of axle 36, which is fixed-to spindle 38—which, in turn, is fixed to the airframe via mounting block 40—and engages the motor cap yoke 34. As before, tilting is controlled by servo-arm rotation; in this case servo arm 14 is connected to arm 44 of the spindle 38 via linkage 42. Alternately, the servo 12 can be mounted to the airframe and connected to an arm similar to 44 but part of the yoke 34. As well, other reduction gear arrangements are possible, but in all cases it is preferable that the motor 22 and propeller turn in the same direction, so that the motor armature adds to rather than subtracts from the gyroscopic effect. Other types that accomplish this include two-stage conventional gearing and planetary gearing.

An implementation of fixed oblique tilting for use with a central drive engine is shown in FIG. 5. The central drive engine and its bevel pinion (not shown) turn the common shaft 56 through bevel gear 55. Considering just one of the identical but opposite pods, bevel pinion 57 is fixed to the end of the common shaft 56—which is supported in the airframe-affixed yoke 59 by frictionless bearings—and drives bevel gear 63, attached propeller shaft 67, and propeller 1 through bevel idler 61. The propeller shaft 67 rotates in frictionless bearings contained within the vertical cylinder-portion of the t-shaped spindle 65 (for a better view of this spindle see item 66 of the opposite pod). The axis of the horizontal shaft-portion of spindle 65 is coincident with the tilt axis of the pod, having the same orientation as axis $u_1$—$u_1$ of FIG. 3. Cantilevered in frictionless bearings contained in the yoke 59, the spindle 65 can swivel about this axis and is controlled in doing so—as was the motor/gearbox 3 of FIG. 3—by the servo mechanism attached to it and connected to the yoke 59. Bevel idler 61 floats on frictionless bearings about the horizontal shaft-portion of the spindle 65.

Figure 6:
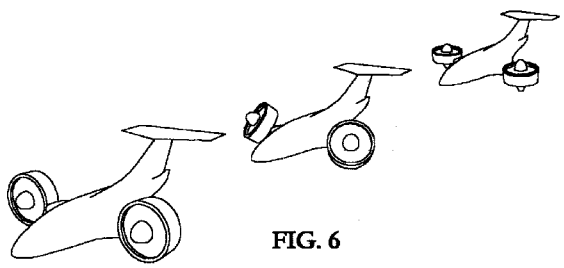
FIG. 6 is a perspective view of the flight sequence of an aircraft with side-by-side fans employing variable oblique tilting.

More suitable and flexible for horizontal motion control—including transition to airplane mode—is variable oblique tilting, where the lateral and longitudinal components of propeller or fan tilting are independently controlled. FIG. 6 depicts an aircraft using such control; its fan axes essentially vertical in hover, then tilted longitudinally for transition but also laterally to maintain pitch control during said transition and to counter any pitching moments resulting from the ensuing forward motion. This control via fan tilting may also be used in airplane mode, where the fan axes are essentially or nominally horizontal, and therefore can supplant conventional control surfaces.

Figure 7:
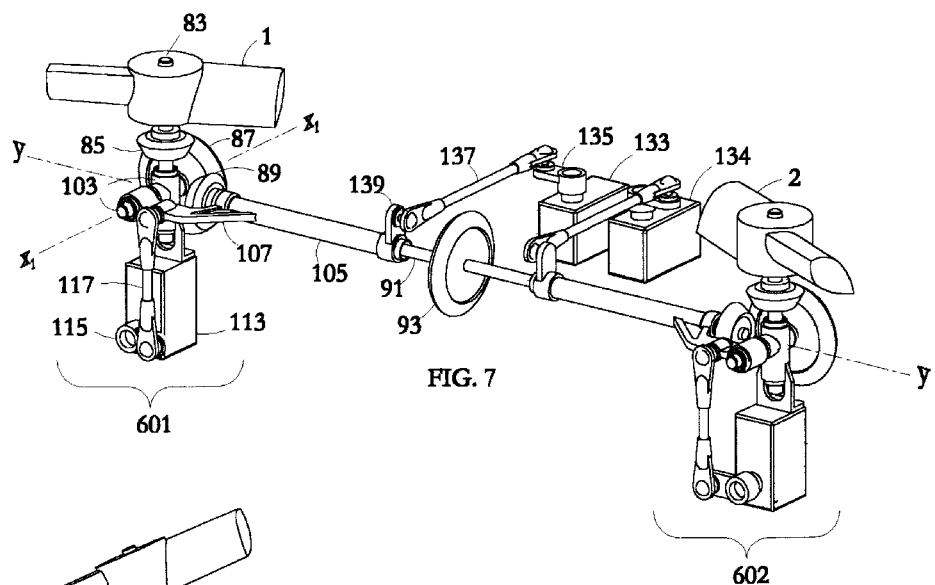
FIG. 7 is a perspective view of a typical drivetrain and control arrangement that may be used in the aircraft of FIG. 6, with the propeller shafts in the vertical position.

FIG. 7 shows the drivetrain and control system that may be used in the aircraft of FIG. 6, which is considered to be the best mode for carrying out the invention. Again, the apparatus consists mainly of two identical but opposite pods, here 601 and 602. Considering pod 601 as representative of both, its propeller or fan 1 is fixed to and driven by propeller shaft 83, which in turn is driven by bevel gears 85, 87, and 89, the latter of which is fixed to and driven by the common horizontal shaft 91. Driving common shaft 91 is gear 93, which meshes with the output gear of the centrally-located drive engine(s) (not shown).

Common shaft 91 rotates freely about its axis (y—y) on frictionless bearings contained within torque-tube 105, which itself—being mounted in bearings fixed to the airframe (not shown)—can rotate about axis y—y in a controlled manner relative to the airframe as will be discussed.

Propeller shaft 83, fixed to bevel gear 85, rotates freely about its own axis in frictionless bearings contained in the vertical portion of the t-spindle 103. Idler bevel gear 87, meshing with bevel gears 85 and 89, rotates freely about local axis $x_1$—$x_1$ on frictionless bearings placed over one side of the horizontal portion of t-spindle 103. The other side of the horizontal portion of t-spindle 103 is supported by—and can rotate about local longitudinal axis $x_1$—$x_1$ in a controlled manner within—frictionless bearings contained within yoke 107, which is rigidly fixed to torque-tube 105.

Lateral tilting of the propeller 1 about axis $x_1$—$x_1$ is prescribed by servo 113—which is fixed to the bottom of the t-spindle 103—through rotation of its servo-arm 115, which is connected to yoke 107 by linkage 117.

Longitudinal tilting of propeller or fan 1 about axis y—y is prescribed by servo 133 (which is fixed to the airframe), through rotation of its servo-arm 135, the associated movement of linkage 137, and the ensuing rotation of the control horn 139 fixed to torque-tube 105. Similarly, longitudinal tilting of propeller or fan 2 is prescribed by servo 134.

Figure 8:
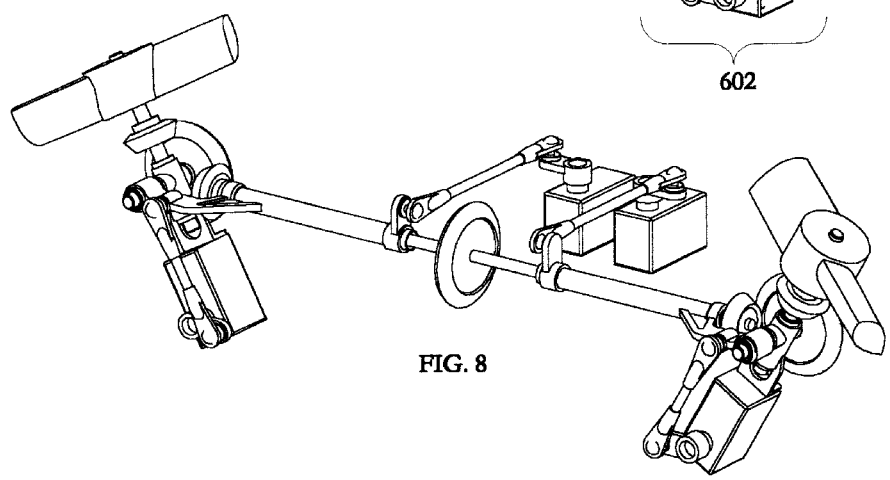
FIG. 8 is the same as FIG. 7, but with the propellers tilted laterally for pitch control.

FIG. 8 shows the servo arms of the lateral tilt-servos rotated and the propellers correspondingly tilted laterally for aircraft pitch control.

With variable oblique tilting any combination of longitudinal and lateral tilting is possible, giving full aircraft control (except perhaps roll in hover or yaw in airplane mode, which are obtained separately by using differential fan thrust-control via either their speeds, collective blade-pitch angles, or other means) in the hover, transition and airplane modes, and the means for achieving said transition. It is possible that the control linkages be replaced by jack screws or other actuation devices without departure from the scope of the invention.

Figure 9:
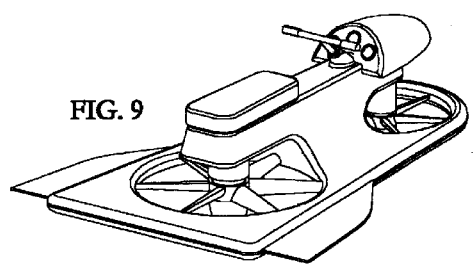
FIG. 9 is a perspective view of a personal air vehicle with tandem fans employing variable oblique tilting.
Figure 10:
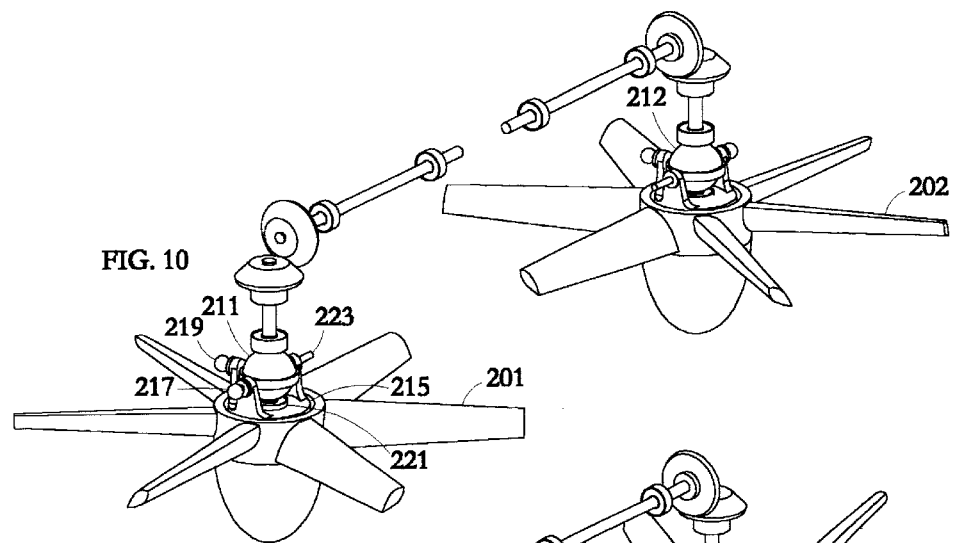
FIG. 10 is a perspective view of a drivetrain and control arrangement for the vehicle of FIG. 9, with fan shafts in the vertical position.
Figure 11:
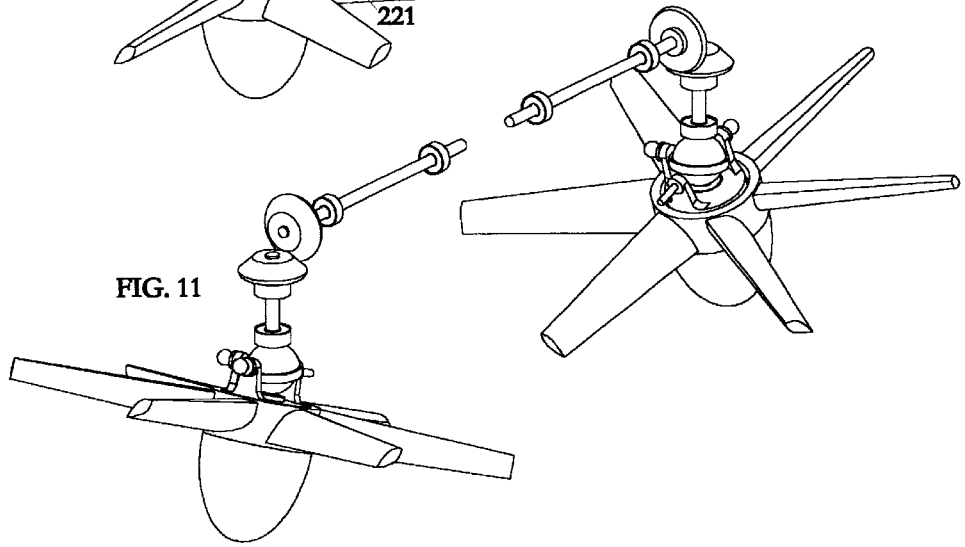
FIG. 11 is the same as FIG. 10, but with the fans tilted longitudinally for roll control.

FIG. 9 shows a personal air vehicle with tandem fans, and its drivetrain and control system shown in FIG. 10 represent another method of implementing the invention. Here, the counter-rotating fans 201 and 202 can tilt in any direction via the constant velocity (CV) joints 211 and 212 incorporated in the shafts driving them. Considering just the one fan 201 it is controlled in doing so by two servos (not shown) that are linkaged to the balls 217 and 219 of the semi-swashplate 215. The latter is non-spinning relative to the vehicle airframe, being fixed to the outer race of frictionless bearing 221—its inner race fixed to fan 201 itself or the short piece of shafting between the CV joint 211 and the fan 201—and prevented from spinning by pin 223 which engages a vertical groove or slot (not shown) in the airframe. FIG. 11 shows the fans 201 and 202 being tilted longitudinally away from one another, thereby creating lateral gyroscopic and fan-torque moments for roll control of the vehicle.

Figure 12:
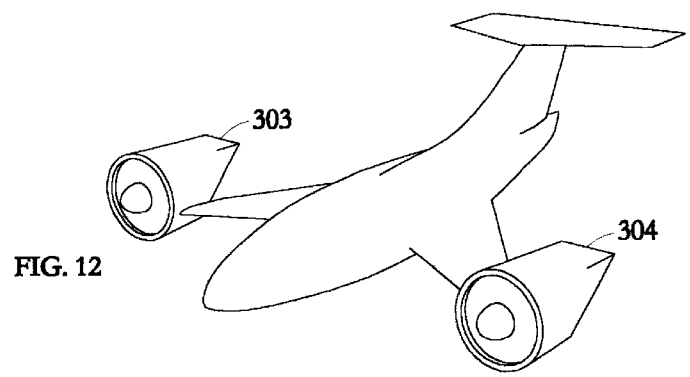
FIG. 12 is a perspective view of an aircraft using opposed tilting in a fixed horizontal plane.
Figure 13:
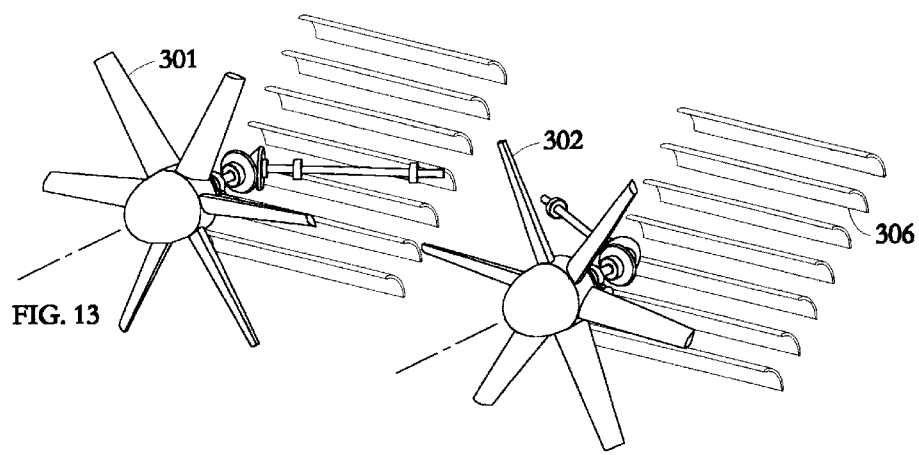
FIG. 13 is a perspective of the drivetrain and control arrangement for the aircraft of FIG. 12, with the fan shafts in the longitudinal direction.
Figure 14:
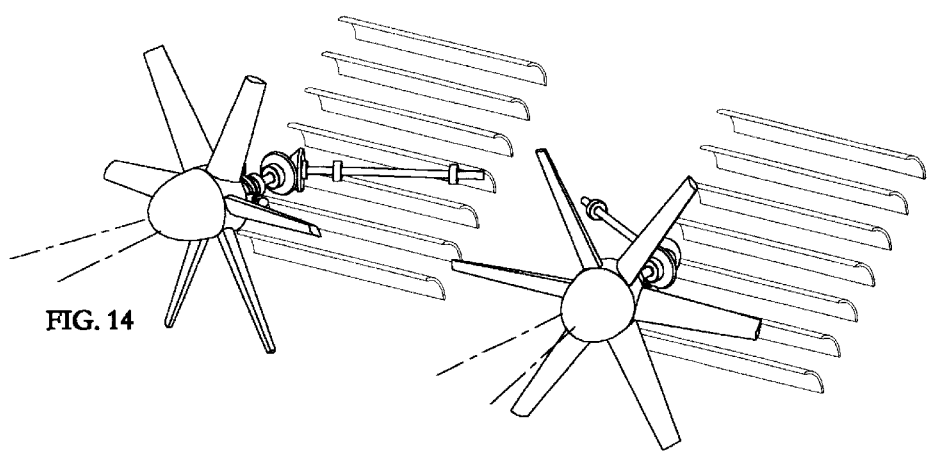
FIG. 14 is the same as FIG. 13 but with the fan shafts tilted away from the longitudinal direction.

FIG. 12 shows another side-by-side fan arrangement, where the fan ducts 303 and 304 are fixed relative to the airframe in the longitudinal direction. FIG. 13 shows the drivetrain and control system for this arrangement, with FIG. 14 showing the axes of the fans 301 and 302 being tilted oppositely in the horizontal plane, thus providing pitch control of the aircraft. This tilting of the fans within the ducts can be accomplished in a manner similar to that for the tandem-fan-vehicle of FIG. 9, and provides pitch control whether the aircraft is in hover or in forward flight. Hovering is achieved by deflecting the fan airstreams downwards via the cascades of turning vanes 306 or similar turning devices contained within—or part of—the ducts 303 and 304; forward motion control, and transition to airplane mode, is achieved by rotating the vanes 306 about their local, lengthwise axes.

I claim:

1. A system for controlling the attitude of an aircraft about an axis in flight, said aircraft comprising two spinning lift or propulsion devices which are counter-rotating, and said system comprising means for tilting the spin axes of said devices such that components of their tilting can essentially be equally and simultaneously towards or away from one another and by an amount and rate dictated by the operator, and the tilting of said devices using said components, thereby generating unbalanced torque-induced and gyroscopic moments which act on the aircraft about an axis essentially perpendicular to the tilt axes of said components, said moments collectively being functions of said amount and rate of said tilting components, and said moments effecting control of the aircraft about said perpendicular axis, wherein while in horizontal and vertical flight substantially all attitude control about said perpendicular axis is by the tilting of the spin axes.

* * * * *